Aug. 11, 1925.
T. C. LONNEY
STEERING WHEEL LOCK
Filed Sept. 13, 1920
1,549,096
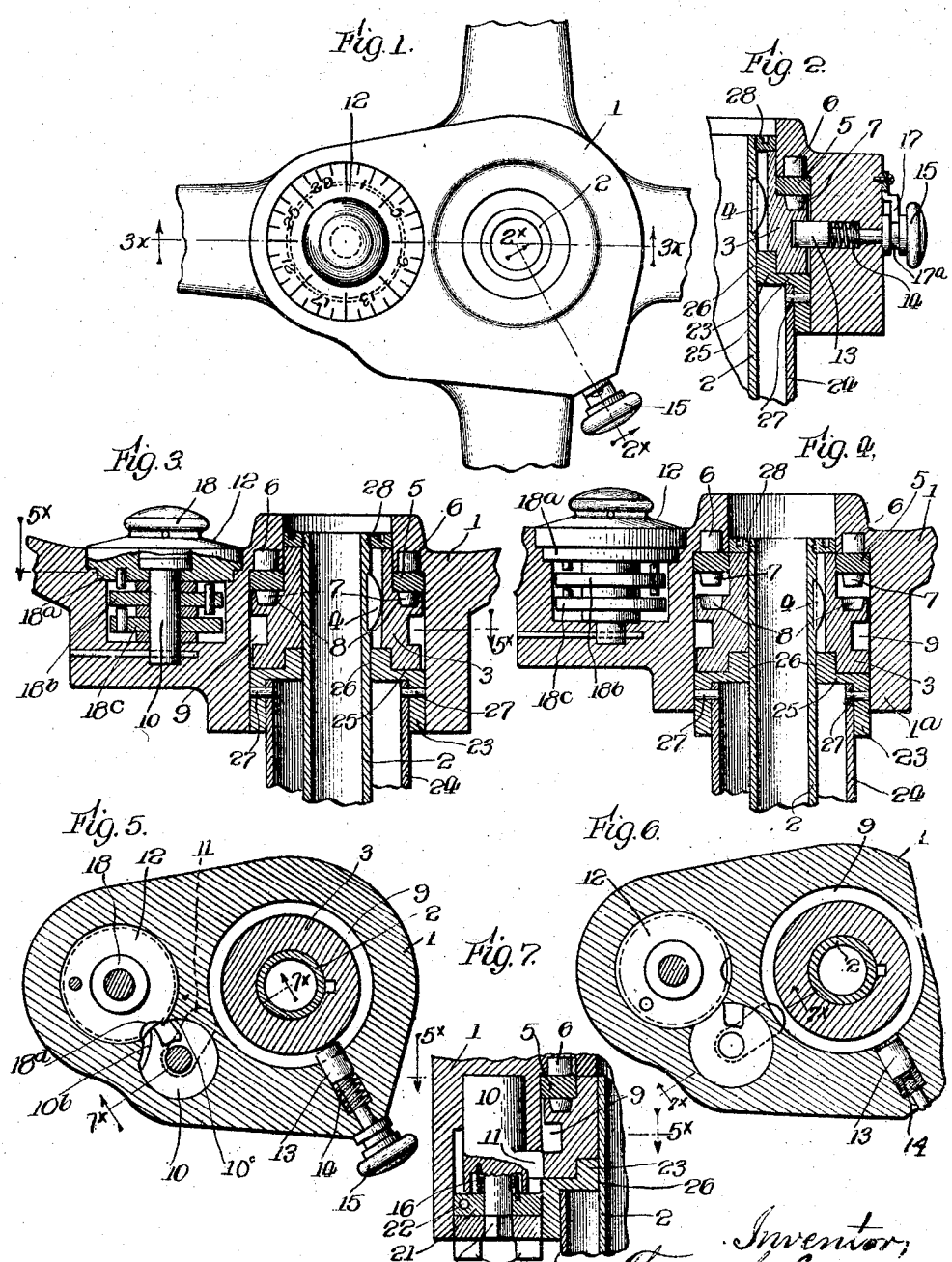

Patented Aug. 11, 1925.

1,549,096

UNITED STATES PATENT OFFICE.

THOMAS C. LONNEY, OF CHICAGO, ILLINOIS, ASSIGNOR OF ONE-HALF TO ELGIN D. SHUPERT, OF CHICAGO, ILLINOIS.

STEERING-WHEEL LOCK.

Application filed September 13, 1920. Serial No. 409,791.

*To all whom it may concern:*

Be it known that I, THOMAS C. LONNEY, a citizen of the United States, residing at Chicago, in the county of Cook and State of Illinois, have invented certain new and useful Improvements in Steering-Wheel Locks, of which the following is a specification.

This invention relates to means through which to establish and disestablish at will the driving connection between a steering wheel and its controlled shaft, and to lock the wheel out of driving connection in order to prevent unauthorized use.

One object of the invention is to provide means whereby the steering shaft will be left entirely free from turning influence of the steering wheel when the latter is locked out of driving position; to which end, one feature of the invention consists in providing a turning bearing for the wheel upon a non-rotating member, preferably mounted upon the fixed steering post, which member is wholly independent of the steering shaft and is so interposed between the wheel and the shaft as to prevent gripping or binding of the wheel upon the shaft otherwise than through the medium of the clutch regularly provided for establishing the driving connection. In the preferred embodiment the non-rotating wheel bearing also affords bearing and support for the clutch bushing which is interposed between the wheel and the steering shaft.

Another object of the invention is to provide means whereby the steering wheel may be safely held in driving relation to the steering shaft and rendered readily releasable therefrom without the complication of manipulating the lock which is relied upon to hold the wheel out of driving relation; to which end, another feature of the invention consists in mounting the wheel with an axial movement to bring it into and out of driving relation to the steering shaft, and having a readily retracted plunger pin for holding it in driving relation, and a lock-controlled mechanism, preferably of the permutation type, which automatically enters into action to lock the wheel against its axial movement as soon as it is moved out of driving position.

A third object of the invention is to provide an improved form of clutch for establishing driving connection between the wheel and the steering shaft; and to this end, a third feature of the invention consists in interposing between an axially presented face of the bushing and the end of the wheel hub, a clutching ring, which may be made of superior metal, having upon its opposite axially presented faces studs adapted to enter correspondingly formed recesses in the respective members to establish driving connection between them.

The invention will be fully understood upon reference to the accompanying drawings, in which—

Figure 1 is a plan view of a portion of a steering wheel.

Figure 2 is a radial section on the line 2×—2× of Figure 1, with the parts in driving position.

Figure 3 is a diametric section on the line 3×—3× of Figure 1 with the parts in driving position.

Figure 4 is a view similar to Figure 3 with the parts locked in non-driving position.

Figure 5 is a transverse section on the line 5×—5× of Figures 3 and 7 with the parts in driving position.

Figure 6 is a view similar to Figure 5 with the parts locked out of driving position; and Figure 7 is a section on the line 7×—7× of Figure 6.

1 represents the hub of the wheel, for instance, the steering wheel of an automobile, and 2 represents the steering shaft to be driven by said wheel. It is customary, in constructions in which it is desired to establish and disestablish driving connection between the wheel 1 and the shaft 2, to interpose a bushing 3 keyed to the shaft 2 as at 4, and through means of which driving connection of the wheel 1 may be established or disestablished at will. It has also been proposed to establish and disestablish such driving connection by moving the wheel 1 axially with relation to the bushing 3, and to make the driving connection through the medium of clutch members brought into and out of engagement by such movement.

According to the present invention, such clutching relation is established through means of a ring 5 confined within the hub 1 and in non-rotatable relation thereto through the medium of any suitable number of studs 6, and having upon its opposed face a series of studs 7, preferably of tapered form, adapted to drop into recesses 8 formed in the bushing 3. The action of such a clutching ring is not materially different from that which has heretofore been used, but the construction of the clutching member in the form of the ring 5 with its studs 6 and 7, is of special advantage in production and assembly, as well as in permitting the use of the most appropriate type of metal for the purpose.

With a clutching construction as above described, the wheel is wholly withdrawn from driving relation to the shaft by raising the wheel until the studs 7 are out of the recesses 8, and re-establshed by simply dropping the wheel until such parts re-engage. The wheel is held in its two positions by means mounted upon the wheel in position to intersect a portion of the bushing 3, for instance, by entering the annular recess 9. According to the present invention, two separate and independent means engaging this particular recess are employed for holding the wheel down and for holding it up, the means for holding the wheel out of driving position being lock-controlled, and therefore releaseable only to the authorized user of the car, such, for instance, as the rotary bolt 10 having an arm 11 adapted to enter the annular groove 9, and which is in turn controlled by the permutation lock 12; but the means for holding the wheel in driving position is preferably of a simple nature which adapts it to be readily withdrawn by hand as the wheel is grasped for raising, and which consists preferably of the plunger 13 normally advanced into the groove 9 by the spring 14, but adapted to be withdrawn by the knob 15. The arm and plunger 13 are in different horizontal planes so that when the wheel is down in driving position the plunger 13 can enter the groove 9 and the arm 11 will rest against the cylindrical surface of the bushing 3 above the groove 9; but when the wheel is raised, plunger 13 will rest against the cylindrical surface of bushing 3 below the groove 9, and arm 11 will enter the groove 9 to hold the wheel elevated. The rotary bolt 10 has a spring 16 that constantly tends to rotate it in the direction to throw the arm 11 into the groove 9. Consequently, whenever the wheel is thrown in an axial direction to either of its two positions, one or the other of the two independent securing devices 11 and 13 will snap into the groove, and must thereafter be withdrawn before such position can be changed.

Plunger pin 13, as stated, is free to be withdrawn at any time, although it may be provided with a keeper 17 that swings transversely of the pin 13 into the recess 17$^a$ thereof to insure against accidental displacement of the pin and release of the wheel while driving, but which can be pushed aside by a slight turning movement at the time of grasping the knob.

But the rotary bolt 10, immediately after snapping into the groove 9, may be locked there by disarranging the tumblers 18$^a$, 18$^b$, 18$^c$ of the permutation lock 18 to bring their circumferential faces into the segmental recess 10$^a$ of rotary bolt 10, and thereby render it impossible to rotate the bolt to release the wheel from non-driving position until the gates 18$^d$ of the tumblers 18$^a$, 18$^b$, 18$^c$ have been reassembled to admit the contour of the bolt, and permit the arm 11 to swing out of the groove 9. Having thus worked the combination, the bolt may be so rotated in opposition to its spring 16 by means of the wing head 19 fitted to the squared shank 20 of the rotary bolt 10 beneath the fixed bearing disk 21 through which said shank extends. Disk 21 may be secured in place by transverse stay-pin 22, and in addition to confining the rotary bolt in its socket in the hub may serve as anchorage for the spring 16.

The contour of that portion of bolt 10 which co-acts with lock 18 may vary so long as the bolt is forced to intersect the lock while withdrawn from groove 9, and the tumblers must intersect the bolt when the latter enters the recess of the bushing 3 or other part with which it interlocks. This combination of parts is claimed broadly in my application Serial No. 364,885, but I prefer to so form the coacting portions of rotary bolt 10 and lock 18 that the former shall have a tongue 10$^b$ that enters the gate 18$^d$ in the major tumbler 18$^a$ of lock 18, and a toe 10$^c$ that impinges against the periphery of said tumbler and serves to limit rotation of the bolt when manipulated through the wing head 19 in opposition to the spring 16.

When the wheel has had its bearing wholly or mainly upon the shaft that it is to control, or upon a bushing carried thereby, it becomes possible to so bind the wheel upon its bearing by a tipping force as to grip the driven member and impart sufficient rotation thereto to temporarily steer the car, notwithstanding the locking of the wheel in unclutched relation to the shaft. The present invention overcomes this objection by rotatably mounting the wheel upon a journal member 23 which is so supported independently of the steering shaft 2, as, for instance, upon the stationary tubular steering post 24 surrounding the shaft, that the wheel is prevented from gripping the shaft by tipping action, notwithstanding its vertical support upon the shaft. Preferably the journal member 23 is provided with step or shoulder 25 to provide bearing also for the bushing 3, through means of which the wheel is clutched to the shaft and thereby center the bushing within the wheel and maintain the radial spacing between them. Moreover, the journal member 23 is further provided with a central bore 26 through which it guides the upper end of the steering shaft 2, and so completes inter-supporting relationship between the several parts while holding the wheel and shaft out of gripping relation. Finally, the depending cylindrical apron 1ª of hub 1, depending around the cylindrical attaching flange of the journal member 23, completes the housing for the clutching parts and bushing, and conceals the transverse pins 27 by which the journal member is secured to post 24. The wheel may be secured upon the steering shaft by any usual means, such, for instance, as spanner-nut 28. It will be noted that the end of the steering shaft 2 lies within the boundaries of adjacent parts of the steering wheel, whereby it is a practical impossibility to operate the steering shaft independently of the wheel 1.

In using the new wheel lock, when it is desired to put the steering wheel out of function, knob 15 is grasped, keeper 17 (Figure 2) is displaced by a slight movement of the finger, plunger 13 is withdrawn, and the wheel is lifted. As soon as studs 7 are clear of sockets 8, locking arm 11 registers with and snaps into groove 9 under the rotating action of spring 16, while plunger 13 rests against the wall of the bushing above the groove, and the wheel is secured in unclutched position. Simultaneously, lock 18 may be rotated to disperse the gates of the tumblers and the locking bolt will be secured against rotation to withdraw arm 11 until the gates are again assembled by working the combination, and steering the vehicle will be impracticable. But by working the combination and turning back the rotary bolt 10 by its wing head 19 until the arm 11 is withdrawn from groove 9, the wheel drops into clutched relation to the shaft (the wheel being slightly rotated to insure registry of the studs 7 and recesses 8), and thereupon plunger 13 will snap into groove 9 to retain driving position, and keeper 17 (if used) will gravitate into detaining relation to the plunger.

I claim:
1. In an automobile steering gear, a pair of members movable axially relatively to one another, said members comprising a wheel member and a shaft member, and a clutch rigid with one of said members establishing and disestablishing driving connection with the other of said members by relative axial movement of the members, said clutch comprising a separately formed clutch ring having upon one axially presented face thereof studs penetrating and holding it in non-rotating relation to that one of said members that carries the ring and having upon its other axially presented face clutching studs moving into and out of engagement with the other of said members.

2. In an automobile steering gear, a wheel, a shaft within said wheel, means for establishing and disestablishing driving connection between the wheel and shaft, and means preventing frictional drive between the wheel and shaft, comprising a non-rotatable journal member interposed between said wheel and shaft, said wheel being movable axially, said wheel being provided with lock controlled and spring pressed means for maintaining said wheel out of driving relationship with said shaft, said wheel being also provided with manually operable spring pressed means for latching said wheel in driving relationship with said shaft.

3. In an automobile steering gear, a wheel, a shaft within said wheel, means for establishing and disestablishing driving connection between the wheel and shaft, and means preventing frictional drive between the wheel and shaft, comprising a non-rotatable journal member interposed between said wheel and shaft and upon which said wheel is supported, said shaft lying within the boundaries of adjacent parts of said wheel, said wheel being movable axially, said wheel being provided with lock controlled and spring pressed means for maintaining said wheel out of driving relationship with said shaft, said wheel being also provided with manually operable spring pressed means for latching said wheel in driving relationship with said shaft.

4. In an automobile steering gear, a fixed tubular housing, a steering shaft within said housing, a journal member mounted non-rotatably upon said housing and affording bearing for said shaft, a bushing keyed to said shaft and also in turning bearing upon said journal member, a wheel in vertical bearing upon said bushing and in lateral turning bearing upon the journal member, and a clutch for establishing driving connection between the wheel and shaft.

5. In an automobile steering gear, a wheel, a steering shaft within said wheel, a steering column encircling said shaft, a bushing non-rotatably mounted upon said column, a bushing non-rotatably connected with said shaft, said latter bushing having a bearing upon said first mentioned bushing, and an axially movable clutch member for establishing and disestablishing driving connection between said wheel and said shaft, said first mentioned bushing constituting a bearing member for said wheel to hold same out of gripping engagement with said second mentioned bushing.

Signed at Chicago, Illinois, this 7th day of September, 1920.

THOMAS C. LONNEY.